United States Patent [19]

Johnsen

[11] 3,746,289
[45] July 17, 1973

[54] REFRIGERATOR FAN MOTOR

[75] Inventor: Eric C. Johnsen, Santa Monica, Calif.

[73] Assignee: Gem Products, Inc., Santa Monica, Calif.

[22] Filed: June 29, 1971

[21] Appl. No.: 157,841

[52] U.S. Cl. .................................. 248/14, 310/91
[51] Int. Cl. ............................................ G11b 17/00
[58] Field of Search ......................... 248/14, 15, 16; 310/91, 51, 162, 164

[56] References Cited
UNITED STATES PATENTS

| 3,043,970 | 7/1962 | Halten et al. | 310/91 |
| 3,434,723 | 3/1969 | Janssen et al. | 310/91 X |
| 3,500,083 | 3/1970 | Dochterman | 310/51 |
| 3,465,182 | 9/1969 | Church et al. | 310/51 |
| 3,270,226 | 8/1966 | McMillan | 310/91 X |
| 3,436,570 | 4/1969 | Engels | 310/91 X |
| 3,482,127 | 12/1969 | Dochterman | 310/91 X |

Primary Examiner—J. Franklin Foss
Attorney—Mahoney, Hornbaker & Schick

[57] ABSTRACT

A refrigerator fan type motor being universally mountable and associable with a multiplicity of refrigerator models of various manufacturers which permits the use of one motor component through the use of specific motor design and construction in conjunction with mounting brackets, fixtures and the like.

11 Claims, 11 Drawing Figures

INVENTOR.
ERIC C. JOHNSEN

BY MAHONEY, HORNBAKER
AND SCHICK
ATTORNEYS

INVENTOR.
ERIC C. JOHNSEN

BY MAHONEY, HORNBAKER
AND SCHICK
ATTORNEYS

REFRIGERATOR FAN MOTOR

BACKGROUND OF THE INVENTION

Equipment manufacturers supplying the after market as opposed to the original equipment manufacturer or O.E.M. market are faced with serious drawbacks in providing replacement parts which are compatible with various manufacturers and the variety of lines of equipment of those manufacturers.

Many manufacturers have peculiar requirements and specifications which, while not presenting any great difficulty for the original supplier, present undue difficulties for the subsequent parts supplier because of the various peculiarities and specifications originally called for in the original equipment. For example, in the replacement part market of a refrigerator fan type motor, most manufacturers require specifically confugured mounting brackets, adapters, mounting plates, retaining members and similar members, all differing from each other with respect to manufacturer and in many instances with respect to models within the line of any one manufacturer. Because the replacement part market is not extremely large, it is virtually impossible for a replacement parts manufacturer to provide replacement parts that would have the exact called-for specifications as the original equipment.

The infeasibility for the most part is economic in that the replacement parts manufacturer is unable to justify the substantial investment in tooling and in inventory of parts which relatively speaking, have small volume demand. Thus, it is important for the replacement parts manufacturer to be able to provide a replacement part which has a high degree of versatility compatible with the structure with which it is intended to be used, while still fulfilling the requirements that the original equipment part calls for.

Thus, this invention is directed to an electric motor of the fan type which is universally mountable in conjunction with a multiplicity of refrigerators and which motors are intended to replace the original equipment or part which requires replacement.

OBJECTS AND SUMMARY OF THE INVENTION

It is an object of the invention to provide a refrigerator fan type motor which is adaptable for universal mounting with a multiplicity of refrigerators.

It is still another important object of the invention to provide a motor of the refrigerator fan type wherein the configuration of the stator and the rotor is such as to allow adaptation for association with a plurality of refrigerator housing and mounting brackets.

It is still a further and more important object of the invention to provide a motor of the fan type which is highly versatile and flexible with respect to various refrigerator models and makes.

It is still another and further important object of the invention to provide, as a replacement part, a refrigerator fan motor which is easily adaptable for association with the refrigerator and compatible as would be the original manufactured equipment.

It is still another and more specific object of the invention to provide an easily mountable electric motor of the fan type which is intended to replace original equipment manufacture of a plurality of refrigerator manufacturers.

These and further objects of the invention will become apparent from the hereinafter following commentary taken in conjunction with the drawings.

Basically, in an exemplary embodiment, the invention is directed to a motor of the refrigerator fan type having a stator of a plurality or rectangularly shaped plates wherein the end plates of the plurality define a first and second plane and having an operatively associated rotor with a shaft extending from one of said first and second planes comprising the combination of universal mounting means for mounting said motor in association with a refrigerator wherein a first pair of through holes is provided through said plurality of plates along a lateral edge thereof. A second pair of through holes is provided through said plurality of plates along an opposite lateral edge; at least a selected bracket member is demountably received on at least one of said end plates defining said first and second planes and retaining means are disposed in at least one of said through holes of each of said first and second pair of through holes for retaining said at least a selected bracket member in relatively rigid relationship with respect to said motor.

DESCRIPTION OF THE BEST EMBODIMENTS CONTEMPLATED

Figure 1:
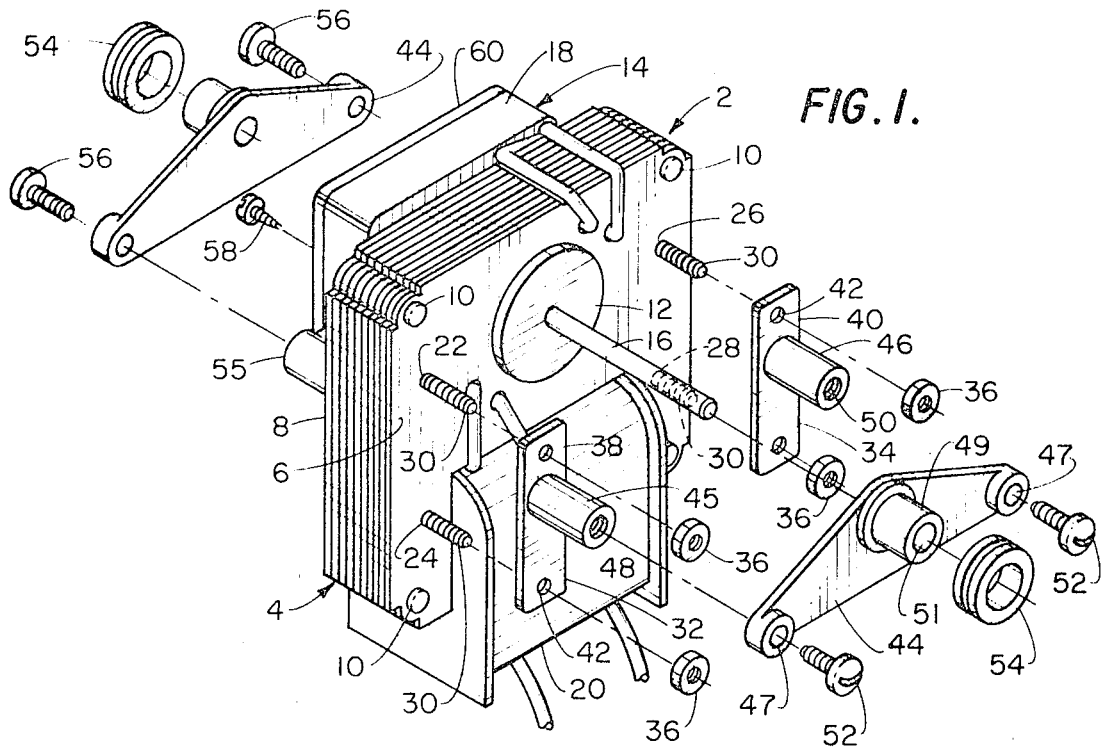
FIG. 1 is an exploded view of one embodiment of the invention.

Referring to FIG. 1, the refrigerator fan type motor 2 of this invention is shown as having a stator 4 made up of a plurality of rectangularly-shaped plates with the end plate 6 defining one planar surface and the end plane 8 defining an opoosite planar surface. The plates making up the stator element 4 are rigidly held together by means of rivets 10.

The plates are so shaped so as to form a passage within which the rotor 12 may rotate.

Actually, the rotor comprises a modular assembly 14 with which the rotor 12 and extenidng shaft 16 is associated as a unit. The module 14 has a plastic housing generally designated 18 and is provided with a bracket-like configuration (partially shown) by which it is rigidly secured in the motor assembly 2 and specifically onto end plate 8 thereby forming what may be considered an off set extension of the plane formed by end plate 8.

The stator 4, rotor module 14, as well as coil 20 are mainly conventional as thus far described except as modified for this invention. For example, in the practise of this invention, however, two pairs of through holes 22, 24, 26 and 28 are provided. Through holes 22 and 24 are formed through the plates of stator 4 along a lateral edge thereof and are in vertical alignment with one another. Likewise, through holes 26 and 28 are provided on the opposite lateral edge of stator 4 and also in vertical alignment with one another. It will be noted that through holes 22 and 26 are in horizontal alignment while through holes 24 and 28 likewise are horizontally aligned.

Disposed in each of the through holes 22, 24, 26 and 28 are through bolts 30 which perform the dual purpose of retaining modular assembly 14 in securement to the motor assembly and provide the means whereby selected brackets or mounting members may be secured on the surface of the end plate 6 making up stator 4 or in some instances on end plate 8.

It will be noted that the end plates 6 and 8 define first and second planar suffaces and the through bolts extend outwardly along the same direction as extending shaft 16 of rotor 12.

In the FIG. 1 embodiment, a pair of stand off brackets 32 and 34 are positioned onto the exterior surface of plate 6 and held in rigid relationship therewith by means of nuts 36 being threaded onto through bolts 22, 24, 26 and 28. Stand off brackets 32 and 34 have a linear platelike portion 38 and 40 respectively, with terminii having apertures 42 positioned so as to be received by through bolts 22, 24, 26 and 28. A central projecting, cylindrical portion 45 and 46 respectively, are provided with tapped bores 48 and 50 to receive an adapter plate for mounting in conjunction with in this example, a center grommet stand off 44 which is compatible with several refrigerator models as manufactured by Admiral, General Electric, Hotpoint, Kelvinator and Norge.

The center grommet stand off member 44 is of triangular configuration transversing the span between tapped projecting portions 45 and 46 of stand off brackets 32 and 34. Member 44 consequently is provided with apertures 47 in the ends thereof and the central projection 49 with aperture 51 to allow passage of the shaft 16 therethrough. The member 44 in this instance is fabricated of moulded plastic and is retained by means of screws 52 in rigid relationship onto brackets 32 and 34. The projection 49 provides retaining surfaces for rubber grommet 54 by which means the assembled motor 2 may be mounted between depending and spaced metal walls of a refrigerator fan motor housing or the like.

A similar support is provided on the back of motor 2 and involves the use of identical bracket 44 which is secured to rotor modular 14 and more specifically outwardly extending bosses 55 which are threaded to receive screws 56 to securely fasten center grommet stand off member 44 as illustrated. The grommet 54 performs the same function as earlier described. The retaining screw 58 generally utilized to assist in holding the back cover plate 60 onto housing 18 is removed to allow clearance and flush engagement with cover plate 60. Thus, screw 58 is generally utilized in the motor 2 but only removed when, for example, a rear center grommet stand off such as 44 is used as illustrated.

Figure 2:
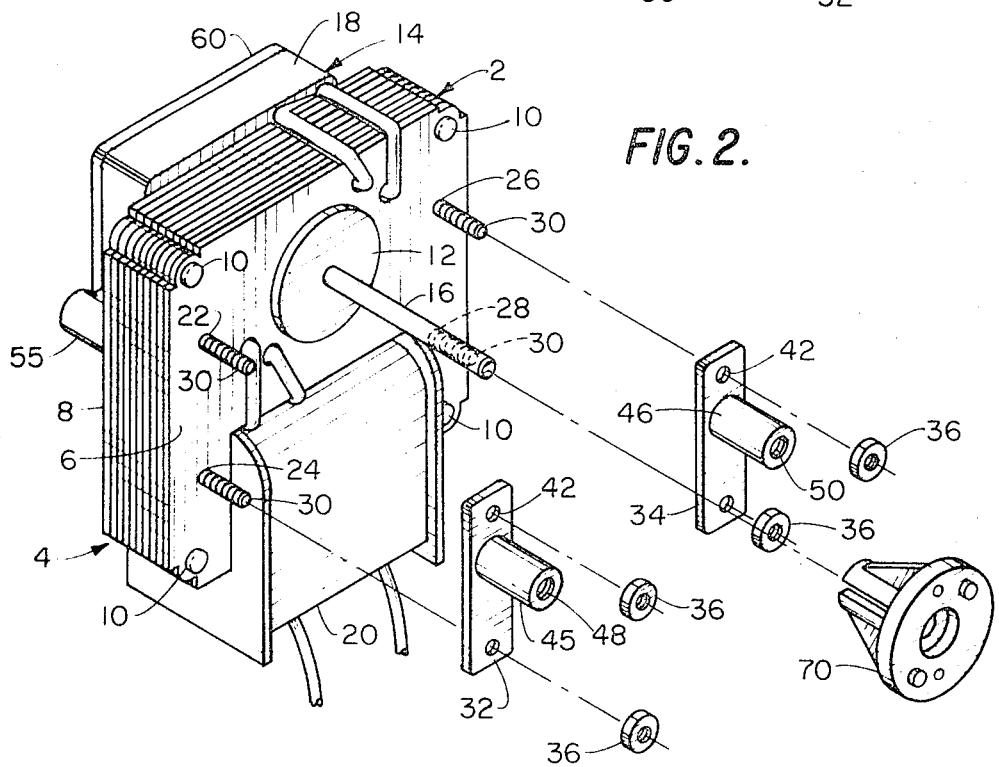
FIG. 2 is an exploded view of still another embodiment of the invention.

Referring now to FIG. 2, it will be observed that the motor 2 is essentially of the same construction as that earlier described but in this instance, the tapped stand off brackets 32 and 34 are used in and by themselves not requiring any additional mounting means or members.

As in the earlier case, the brackets 32 amd 34 are mounted on through bolts 30 and securely fastened in place by retaining nuts 36. The tapped bores 48 and 50 will accommodate a front mounting securement to a variety of models of refrigerators manufactured by such manufacturers as Admiral, Coldspot, Frigidaire, Hotpoint, Norge, Westinghouse and Whirlpool. Also illustrated in FIG. 2 is a fan hub adapter 70 which frictionally engages the rotor shaft 16 and which is adapted to be secured to a fan member not shown.

Figure 3A:
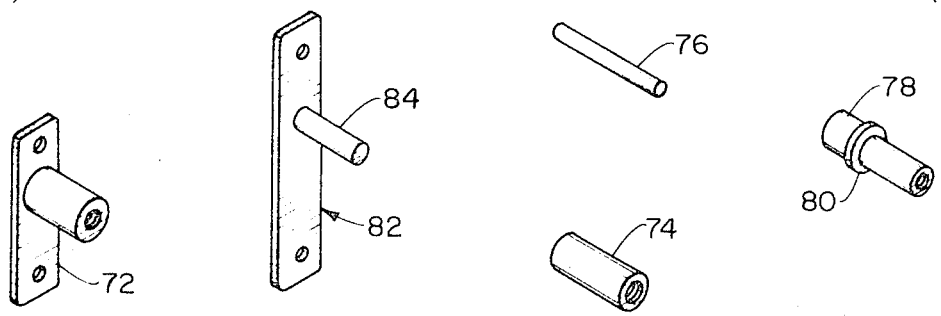
FIG. 3a is a view of the various bracket members and components which may be used with the motor of this invention.

FIG. 3a illustrates some of the mounting means that may be utilized in conjunction with the motor 2 and the bracket to the extreme left designated 72 herein has already been described and is essentially the same as either one of the brackets 32 or 34. However, by utilization of tapped stand offs such as 74, pin mmeber 76 or an elongated stand off member 78, a variety of suitable retaining and mounting members may be fabricated to meet a variety of needs. For example, the stand off 74 is mountable on a screw or nut of the motor 2 and likewise the stand off 78 is flanged and accommodates the grommet 80 and each of the mmebers alone or in combination will meet a variety of needs. The remaining bracket member 82 is essentially the same as tapped stand off 72 with the exception that instead of a tapped stand off a pin stand off 84 is utilized.

Figure 3B:
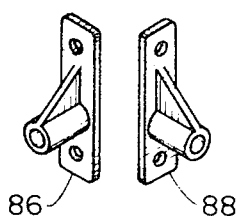
FIGS. 3b, 3c, 3d, 3e and 3f are still other embodiments of retaining members that may be used in the practice of this invention.

FIG. 3b illustrates a specific stand off used in conjunction with a Hotpoint refrigerator, the stand off 86 being configured for left hand mounting while the stand off 88 is configured for right hand mounting.

Figure 3C:
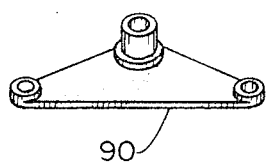

FIG. 3c illustrates the center grommet stand off 90 which is essentially the same as the member 44 illustrated in FIG. 1

Figure 3D:
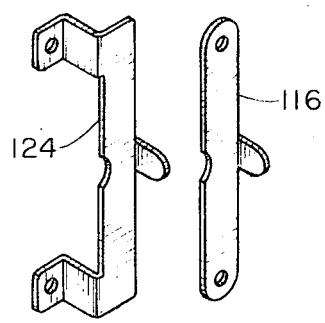
Figure 4:
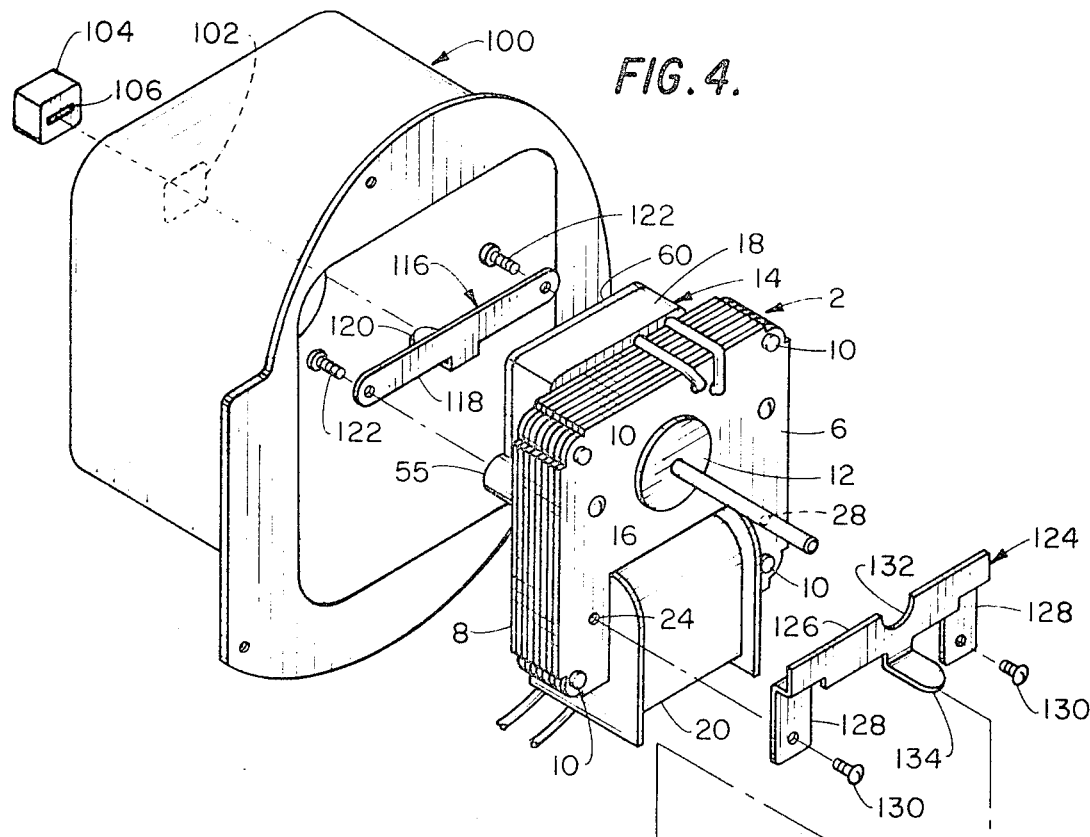
FIG. 4 is an exploded view of another embodiment of the invention showing how the fan motor is used in conjunction with the bracket members shown in FIG. 3d.
Figure 5:
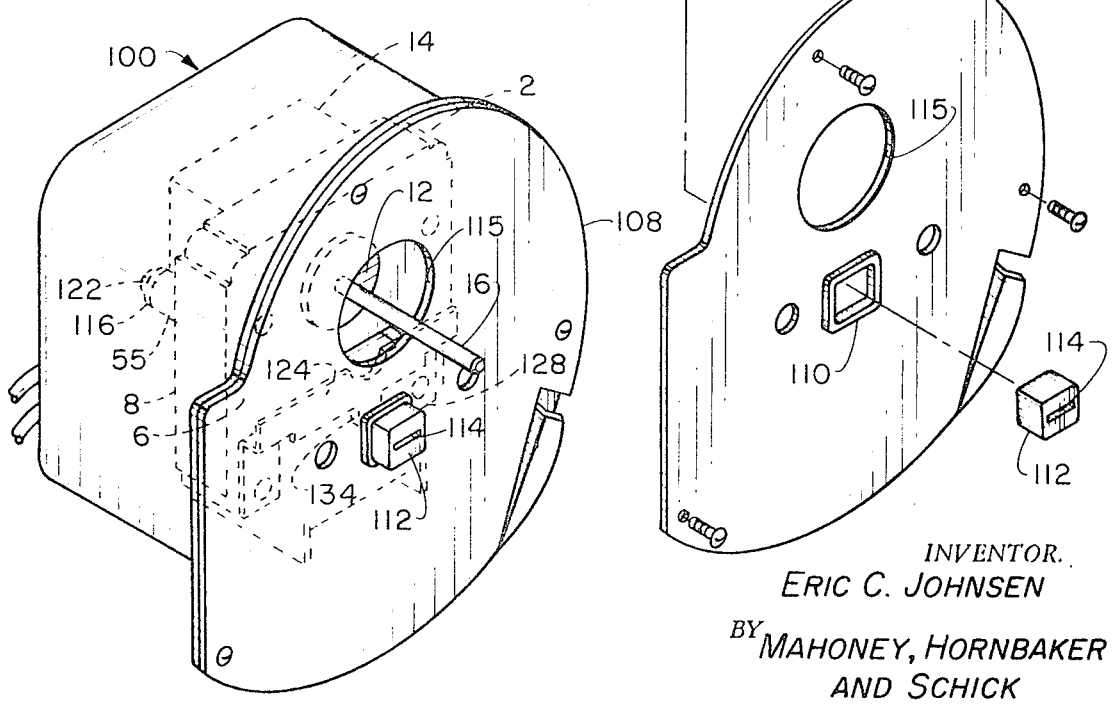
FIG. 5 is an assembled view of the FIG. 4 embodiment shown in a motor housing.

FIG. 3d illustrates a rubber block mounting bracket for use in conjunction with a Westinghouse refrigerator and these members are shown in FIGS. 4 and 5 and will be detailed hereinafter.

Figure 3E:
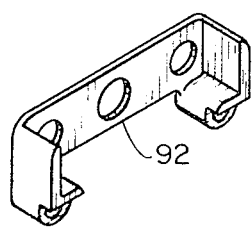

FIG. 3e illustrates a Gibson refrigerator stand off and it will be noted that this bracket 92 is again adapted to be mounted by means of through bolts of the motor and provides a slip on or fastening configuration to coact with the structure of the refrigerator.

Figure 3F:
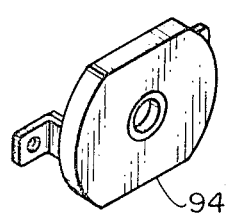

FIG. 3f illustrates a front bearing support 94 which in conjunction with stand offs such as 72 may be used to provide bearing support when and where needed.

Figure 3G:
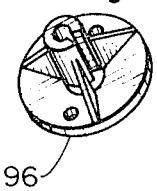
FIGS. 3g is a perspective view of a hub adapter for use with a fan type motor.

FIG. 3g illustrates a fan hub adapter 96 as previously described in conjunction with FIG. 2.

Referring now to FIGS. 4 and 5 a special tongue mounting means is illustrated for Westinghouse refrigerator application and specifically for mounting in a motor box or the like.

Herein motor 2 is to be mounted in a motor box 100 having walls which define an open faced chamber within which the motor 2 is to be secured in operative relationship. The back wall of housing 100 is provided with aperture 102 which receives rear wall rubber mounting block 104 in secured and retained relationship therewith. The mounting block 104 is provided with a receiving slot 106 for purposes which will be described. The front plate 108 of motor box 100 is likewise provided with an aperture 110 to receive front mounting block 112. Mounting block 112 similarly is of rubber and is provided with a receiving slot 114. The front plate 108 is provided with a shaft opening 115 and appropriate provisions are made so that plate 108 may be secured to housing 100 as shown in FIG. 5.

In this particular instance, in order to mount the motor 2 within the housing 100 in the manner illustrated in FIG. 5, it is necessary to secure a first back tongue bracket 116 to rotor module 14. In this instance, the rear tongue bracket 116 has elongate section 118 with a central depending horizontally extending tongue-like projection 120 which as can be seen is adapted to be received within retaining or receiving slot 106 of rear block 104. The ends of bracket 116 are apertured so that it may be secured to the rear bosses 55 of the rotor module 14 by means of retaining screws 122.

The front mounting bracket 124 has an elongate middle spanning section 126 being reversed L-shaped in configuration with two depending end portions 128 by which means the bracket 124 is secured to motor 2 as by utilization of through holes 24 and 28, securement being obtained by means of bolts 130.

Bracket 124 has a central notch 132 to provide clearance for the shaft 16 of rotor 12 and positioned therebelow is a depending and horizontally extending tongue portion 134 which is adapted to be received by retaining slot 114 of front mounting block 112 in the manner illustrated in FIG. 5.

For other mounting in motor boxes, as for example, in the Westinghouse refrigerator, the tongue brackets and specifically the front one is used in conjunction with a stand off such as 72 illustrated in FIG. 3a. If such is the case, the bracket member 124 instead of being secured on the exterior surface of end plate 6 and retained by means of through holes 24, 28 and through bolts 130, it is secured to the tapped extending portions of the bracket 72. These modifications and versatile coaction and cooperation of the various bracket members and components thereof will be obvious to those of skill in the art.

The materials of construction for the various mounting and securement members are preferably the non-conducting, high impact strength, easily moulded plastics. For obvious reasons, because of the electrical character of the installations, plastics are the preferred material but in some cases, it may be desirable that the brackets and components thereof be fabricated of metal to meet specific needs.

There has thus been described a refrigerator fan type motor and mounting means which makes for universal applicability and versatility. It is now possible with the herein disclosed invention to limit motor inventories and to adapt motors to a variety of end uses depending upon the unique needs of the refrigerators with which the motors are to be used.

Various modifications and adaptations will make themselves known to those of skill in the art all of which will not detract from the spirit and scope of the herein disclosed invention, all of which modifications are intended to be covered by the appended claims.

I claim:

1. In a motor of the refrigerator fan-type having a stator of a plurality of rectangularly shaped plates, the end plates of said plurality defining a first and a second plane and an operatively associated rotor modular assembly adjacent said first plane associated with a rotor and with a shaft extending from said second plane, the combination of: universal mounting means for mounting said motor in association with a refrigerator comprising a first pair of through holes through said plurality of plates along a lateral edge thereof; a second pair of through holes through said plurality of plates along an opposite lateral edge; at least a selected bracket member demountably received on said second plane and removable retaining means disposed in and through said through holes of each of said first and second pair of through holes for retaining said at least a selected bracket member in relatively rigid relationship with respect to said motor and for retaining said modular assembly in operative relationship with said stator.

2. The motor in accordance with claim 1 wherein each of the through holes of said first and second pairs of through holes are in vertical alignment with respect to one another.

3. The motor in accordance with claim 2 wherein the through holes of said first pair of through holes are in horizontal alignment with the through holes of said second pair of through holes.

4. The motor in accordance with claim 3 wherein said retaining means comprises through bolts and associated nuts.

5. The motor in accordance with claim 4 wherein said modular assembly is adapted to mount an additional selected bracket member to cooperate with the other of said bracket member.

6. The motor in accordance with claim 4 wherein said at least a selected bracket member is adapted to be associated with a supporting bracket of a refrigerator in secured relationship therewith.

7. The motor in accordance with claim 6 wherein said at least a selected bracket member comprises an elongate plate having a projecting stand off and two such brackets are mountable in side by side relationship with said extending shaft being intermediate said stand offs.

8. The motor in accordance with claim 7 wherein said stand offs have threaded bores to receive a triangular grommet-carrying member in secured relationship which spans said stand offs, with the shaft of said rotor extending through the spanning portion thereof.

9. The motor in accordance with claim 4 wherein said at least a bracket member comprises an elongate transverse bar having terminal depending portions, said depending portions having apertures therethrough by which said bracket is retained in a selected pair of horizontally aligned through holes, the intermediate portion of said bar having a horizontally extending tab for insertion into a retaining block associated with a refrigerator motor fan housing.

10. The motor in accordance with claim 9 wherein an additional bracket member is mounted on said modular assembly and comprises an elongate plate member having apertures in the ends thereof said plate member spanning said modular assembly and being retained thereon by retaining screws and an intermediate horizontal extending tab for retaining block retention.

11. In a motor of the refrigerator fan-type having a stator of a plurality of rectangularly shaped plates, the end plates of said plurality defining a first and a second plane, and an operatively associated rotor modular assembly mounted on one plane and a shaft extending from the other plane; the combination of: mounting means for mounting said motor in association with a refrigerator comprising an elongated grommet-carrying member, a pair of stand-offs adapted to be removably retained on the plane from which the shaft extends in positions opposite each other and on different sides of said shaft, said grommet-carrying member being adapted to span and be removably retained on said stand-offs with the shaft extending through the spanning portion of said member.

* * * * *